US009424262B2

(12) United States Patent
Hwang et al.

(10) Patent No.: US 9,424,262 B2
(45) Date of Patent: Aug. 23, 2016

(54) COMPUTING SYSTEM AND DATA MANAGEMENT METHOD THEREOF

(71) Applicant: SAMSUNG ELECTRONICS CO., LTD., Suwon-si, Gyeonggi-do (KR)

(72) Inventors: Joo-Young Hwang, Suwon-si (KR); Chul Lee, Hwaseong-si (KR); Jae-Geuk Kim, Hwaseong-si (KR); Chang-Man Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 264 days.

(21) Appl. No.: 14/033,596

(22) Filed: Sep. 23, 2013

(65) Prior Publication Data

US 2014/0095552 A1 Apr. 3, 2014

(30) Foreign Application Priority Data

Sep. 28, 2012 (KR) .................. 10-2012-0109177

(51) Int. Cl.
*G06F 17/30* (2006.01)

(52) U.S. Cl.
CPC ... *G06F 17/30091* (2013.01); *G06F 17/30233* (2013.01)

(58) Field of Classification Search
None
See application file for complete search history.

(56) References Cited

U.S. PATENT DOCUMENTS

| 5,537,588 A | 7/1996 | Engelmann et al. |
| 7,065,619 B1 | 6/2006 | Zhu et al. |
| 7,257,690 B1 * | 8/2007 | Baird .............................. 711/162 |
| 7,680,837 B2 | 3/2010 | Yamato |
| 7,743,035 B2 | 6/2010 | Chen et al. |
| 8,024,525 B2 | 9/2011 | Willis et al. |
| 2002/0032691 A1 | 3/2002 | Rabii et al. |
| 2008/0172428 A1 | 7/2008 | Stokes |
| 2008/0288713 A1* | 11/2008 | Lee et al. ....................... 711/103 |
| 2012/0011340 A1* | 1/2012 | Flynn et al. ................... 711/171 |

FOREIGN PATENT DOCUMENTS

| KR | 100622130 A | 6/2006 |
| KR | 20070096429 A | 10/2007 |
| KR | 100895429 A | 10/2008 |
| KR | 100954603 A | 11/2009 |

OTHER PUBLICATIONS

"What is Sequential Access?"; InnovateUS; 2013; retrieved on Aug. 8, 2015 from: http://www.innovateus.net/science/what-sequential-access.*
"Sequential Access"; Webopedia; retrieved on Aug. 8, 2015 from: http://www.webopedia.com/TERM/S/sequential_access.html.*
"SSD"; Computer Desktop Encyclopedia; The Computer Language Company; retrieved on Aug. 1, 2015 from: http://lookup.computerlanguage.com/host_app/search?cid=C999999&term=SSD&lookup.x=0&lookup.y=0.*

* cited by examiner

*Primary Examiner* — Alex Gofman
*Assistant Examiner* — Umar Mian
(74) *Attorney, Agent, or Firm* — Volentine & Whitt, PLLC (57) ABSTRACT

A data management method of a computing system includes dividing a storage device into a first area and a second area, storing data and nodes related to the data in the second area, and storing a node address table in the first area. The node address table includes node identifiers corresponding to the nodes and physical addresses corresponding to the node identifiers.

11 Claims, 12 Drawing Sheets

| NODE ID | PHYSICAL ADDRESS |
|---------|------------------|
| N0 | a |
| N1 | b |
| N2 | c |
| ⋮ | |

COMPUTING SYSTEM AND DATA MANAGEMENT METHOD THEREOF

CROSS-REFERENCE TO RELATED APPLICATIONS

A claim for priority under 35 U.S.C. §119 is made to Korean Patent Application No. 10-2012-0109177, filed on Sep. 28, 2012, in the Korean Intellectual Property Office, the entire contents of which are hereby incorporated by reference.

BACKGROUND

The inventive concept relates to a computing system and a data management method thereof, and more particularly to a computing system and a data management method thereof using a log structured file system.

A log structured file system has been proposed from a server storage system using a hard disk drive. Since the hard disk drive uses a rotational motor, operation of the hard disk drive includes seek latency and rotational latency. Accordingly, a log structured file system constructs the whole disk as one log, and performs sequential write operations. That is, when correcting a file, the log structured file system does not correct data at the original position, but adds corrected data to a last portion of the log.

On the other hand, the log structured file system should correct a large amount of metadata related to the corrected data. That is, an additional write operation is necessary. This is called a wandering tree problem.

SUMMARY

Embodiments of the inventive concept provide a data management method of a computing system, which can minimize the wandering tree problem. Also, embodiments of the inventive concept provide a computing system and a storage device, which can minimize the wandering tree problem.

Additional advantages, subjects, and features of the inventive concept will be set forth in part in the description which follows and in part will become apparent to those having ordinary skill in the art upon examination of the following or may be learned from practice of the inventive concept.

According to an aspect of the inventive concept, there is provided a data management method of a computing system. The method includes dividing a storage device into a first area and a second area, storing a plurality of data and a plurality of nodes related to the plurality of data in the second area, and storing a node address table in the first area. The node address table includes a plurality of node identifiers corresponding to the plurality of nodes and a plurality of physical addresses corresponding to the plurality of node identifiers.

According to another aspect of the inventive concept, there is provided a computing system including a storage device. The storage device includes a first area configured to store a node address table, and a second area configured to store a plurality of data and a plurality of nodes related to the plurality of data. The node address table includes a plurality of node identifiers corresponding to the respective nodes and a plurality of physical addresses corresponding to the plurality of node identifiers.

According to another aspect of the inventive concept, there is provided a computing system, including a storage device having a storage area, and a host configured to control writing of data in the storage device. The host includes a file system configured to divide the storage area into a first area and a second area. The second area is configured to store a plurality of data and a plurality of nodes related to the plurality of data using a sequential access method. The first area is configured to store a node address table including a plurality of node identifiers corresponding to the plurality of nodes and a plurality of physical addresses corresponding to the plurality of node identifiers. A physical address corresponding to a node identifier is updated to indicate a new location of a node corresponding to the node identifier.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

The inventive concept will now be described more fully with reference to the following detailed description and accompanying drawings, in which exemplary embodiments of the inventive concept are shown. The inventive concept may, however, be embodied in many different forms and should not be construed as being limited to the embodiments set forth herein. Rather, these embodiments are provided so that this disclosure will be thorough and complete, and will fully convey the concept of the inventive concept to one of ordinary skill in the art. Thus, in some embodiments, well-known methods, procedures, components, and circuitry have not been described in detail to avoid unnecessarily obscuring aspects of the present invention. In the drawings, like reference numerals denote like elements throughout, and the sizes or thicknesses of elements and layers may be exaggerated for clarity of explanation.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the present teachings.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "comprising," when used in this specification, specify the presence of the stated features, integers, steps, operations, elements, and/or components, but do not preclude the presence or addition of one or more other features, integers, steps, operations, elements, components, and/or groups thereof. The term "and/or" includes each of mentioned items and all combinations of one or more of the items. The term "exemplary" indicates an illustration or example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For example, in the case where one constituent element "transmits or outputs" data or a signal to another constituent element, this means that the one constituent element may directly "transmit or output" the data or the signal to the other constituent element, or may "transmit or output" the data or the signal to the other constituent element through at least another constituent element.

Figure 1:
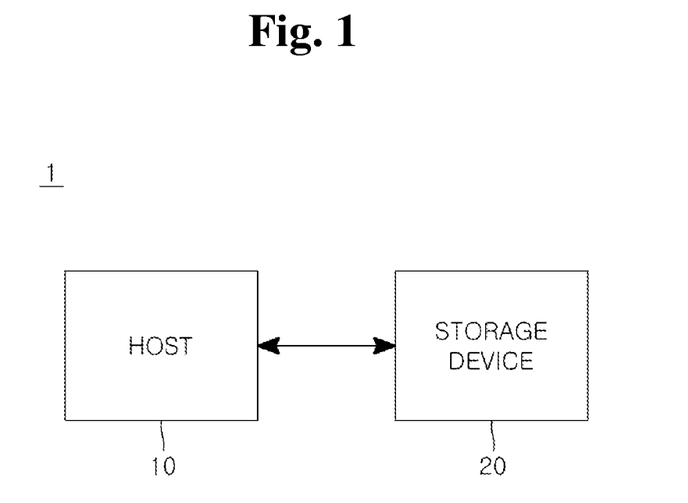
FIG. 1 is a block diagram explaining a computing system, according to an embodiment of the inventive concept.
Figure 2:
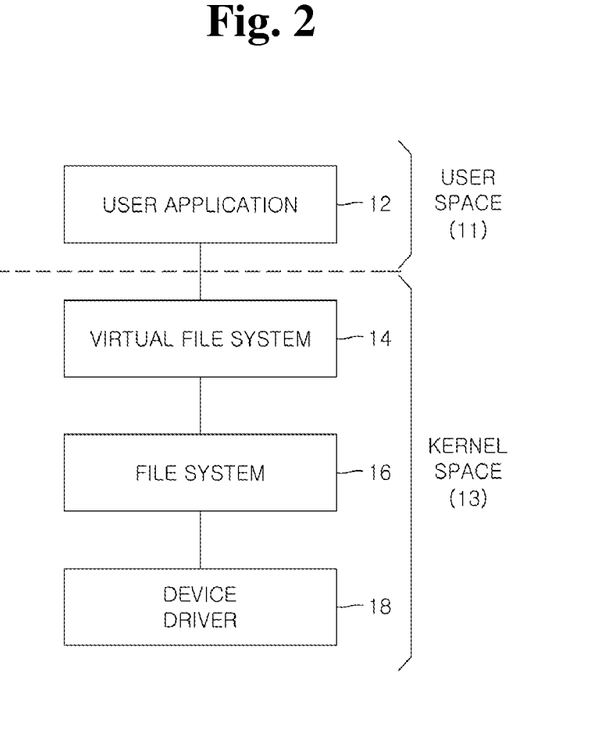
FIG. 2 is a block diagram explaining a computing a host of FIG. 1, according to an embodiment of the inventive concept.
Figure 3:
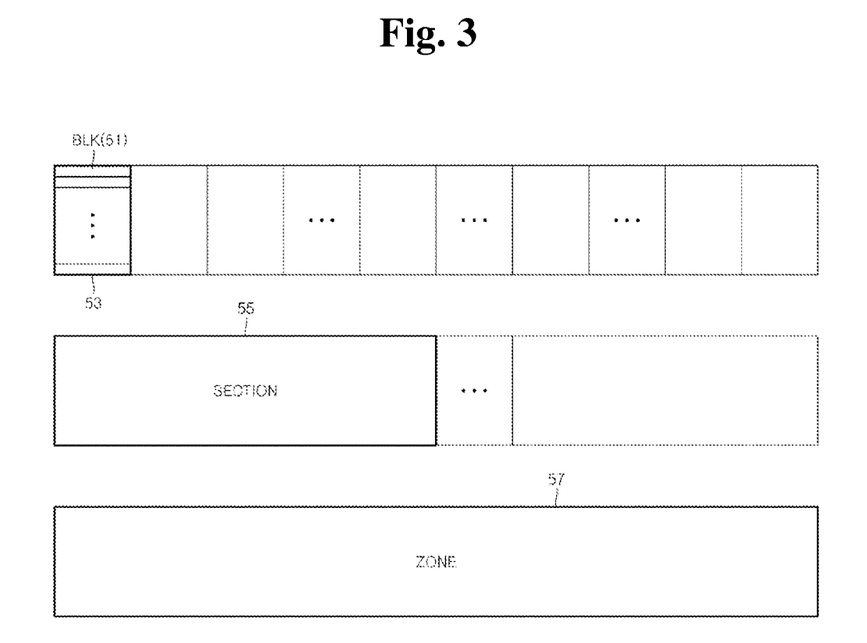
FIGS. 3 and 5 are block diagrams explaining a storage device of FIG. 1, according to an embodiment of the inventive concept.
Figure 4:
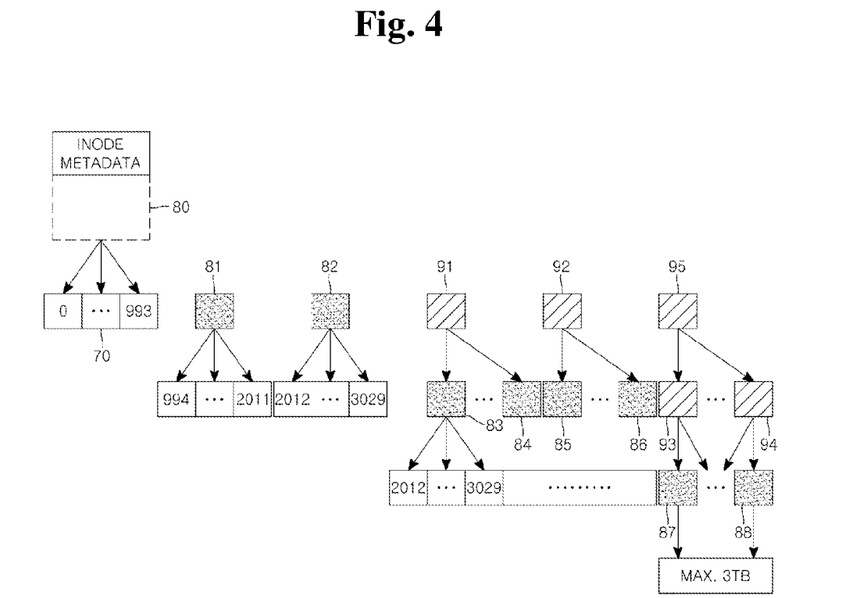
FIG. 4 is a diagram explaining the structure of a file stored in the storage of FIG. 1, according to an embodiment of the inventive concept.
Figure 5:
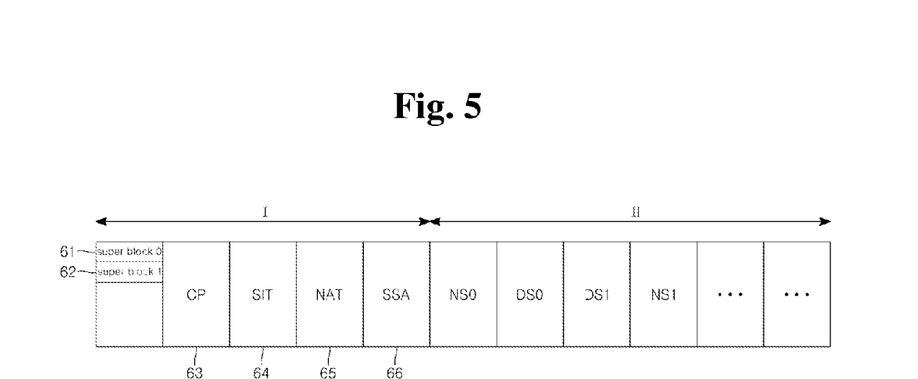
Figure 6:
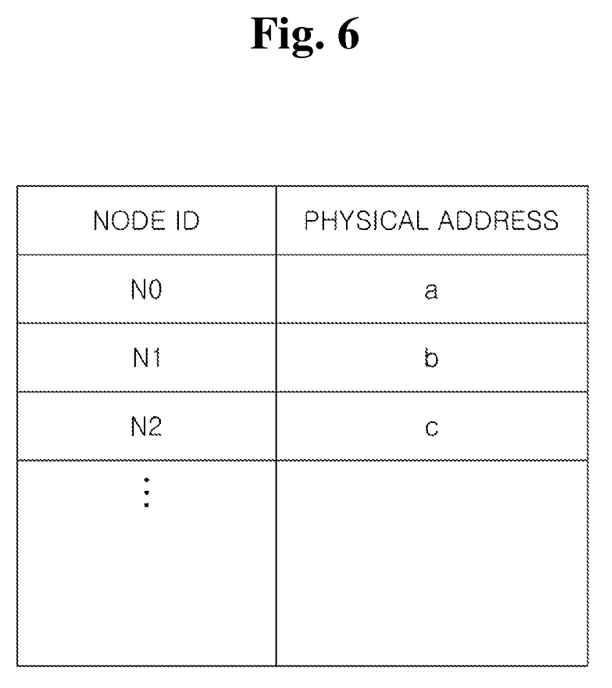
FIG. 6 is a diagram explaining a node address table, according to an embodiment of the inventive concept.

FIG. 1 is a block diagram of a computing system, according to an exemplary embodiment of the inventive concept. FIG. 2 is a block diagram of a host of FIG. 1, according to an exemplary embodiment. FIG. 3 is a block diagram of a storage device of FIG. 1, according to an exemplary embodiment. FIG. 4 is a diagram explaining a structure of a file stored in the storage device of FIG. 1, according to an exemplary embodiment. FIG. 5 is a block diagram for explaining the storage device of FIG. 1, according to an exemplary embodiment. FIG. 6 illustrates a node address table, according to an exemplary embodiment.

First, referring to FIG. 1, a computing system 1 includes a host 10 and a storage device 20. The host 10 and the storage device 20 communicate with each other using a specific protocol. For example, the host 10 and the storage device 20 may communicate with each other via at least one of various interface protocols, such as a Universal Serial Bus (USB) protocol, a Multimedia Card (MMC) protocol, a Peripheral Component Interconnection (PCI) protocol, a PCI-Express (PCI-E) protocol, an Advanced Technology Attachment (ATA) protocol, a Serial ATA (SATA) protocol, a Small Computer Small Interface (SCSI) protocol, an Enhanced Small Disk Interface (ESDI) protocol, and an Integrated Drive Electronics (IDE) protocol. However, the interface protocols are not limited thereto. The host 10 controls the storage device 20. For example, the host 10 may write data in the storage device 20 and/or read the data from the storage device 20.

Referring to FIG. 2, the host 10 includes a user space 11 and a kernel space 13. The user space 11 is a region in which a user application 12 is executed, and the kernel space 13 is a restrictively reserved region to execute kernel. In order for the user space 11 to access the kernel space 13, a system call may be used.

In the depicted embodiment, the kernel space 13 includes a virtual file system 14, a file system 16, and a device driver 18. The file system 16 may be implemented using one or more file systems 16. For example, the file systems 16 may be ext2, ntfs, smbfs, proc, and the like. Further, a computing system 1 according to an embodiment may include a flash-friendly file system (F2FS). The F2Fs will be described below in reference to FIGS. 3 to 11.

The virtual file system 14 enables one or more file systems 16 to operate with each other. In order to perform read/write tasks with respect to different file systems 16 of different media, standardized system calls may be used. For example, system calls, such as open( ), read( ), and write( ), may be used regardless of the kind of the file systems 16. That is, the virtual file system 14 is an abstract layer that exists between the user space 11 and the file system 16.

The device driver 18 controls an interface between hardware and a user application (or operating system). The device driver 18 is a program that is necessary for the hardware to normally operate under a specific operating system.

The manner in which the F2FS controls the storage device 20 is described below. The storage device 20 may be one of various kinds of card storages, such as an SSD (Solid State Drive), HDD (Hard Disk Drive), and eMMC, or a data server, but is not limited thereto.

The storage device 20 may be configured as illustrated in FIG. 3, for example. A segment (SEGMENT) 53 includes a plurality of blocks (BLK) 51, a section (SECTION) 55 includes a plurality of segments 53, and a zone (ZONE) 57 includes a plurality of sections 55.

For example, the block 51 may have a size of 4 Kbytes, and the segment 53 may include 512 blocks 51, so that each segment 53 has a size of 2 Mbytes. Such a configuration may be determined when the storage device 20 is formatted, although the various embodiments are not limited thereto. The sizes of the section 55 and the zone 57 may be corrected at the time of formatting. In the F2FS file system, for example, all data may be read/written page units of 4 Kbyte. That is, one page may be stored in the block 51, and multiple pages may be stored in the segment 53.

A file that is stored in the storage device 20 may have an indexing structure as illustrated in FIG. 4. One file may include a plurality of data and a plurality of nodes, which are related to the plurality of data. Data blocks 70 are regions to store data, and node blocks 80, 81 to 88, and 91 to 95 are regions to store nodes.

The node blocks 80, 81 to 88, and 91 to 95 may include direct node blocks 81 to 88, indirect node blocks 91 to 95, and an Mode block 80. The direct node blocks 81 to 88 include data pointers directly indicating the data blocks 70.

The indirect node blocks 91 to 95 include pointers indicating other node blocks (that is, lower node blocks) 83 to 88 which are not the data blocks 70. The indirect node blocks 91 to 95 may include, for example, first indirect node blocks 91 to 94 and a second indirect node block 95. The first indirect node blocks 91 to 94 include first node pointers indicating the direct node blocks 83 to 88. The second indirect node block 95 includes second node pointers indicating the first indirect node blocks 93 and 94.

The inode block 80 may include one or more data pointers, first node pointers indicating the direct node blocks 81 and 82, second node pointers indicating the first indirect node blocks 91 and 92, and a third node pointer indicating the second indirect node block 95.

One file may be of 3T byte at maximum, for example, and this large-capacity file may have the following index structure. For example, 994 data pointers are provided in the inode block 80, and the 994 data pointers may indicate 994 data blocks 70. Two first node pointers are provided, and each of the two first node pointers may indicate two direct node blocks 81 and 82. Two second node pointers are provided, and the two second node pointers may indicate two first indirect node blocks 91 and 92. One third node pointer is provided, and may indicate the second indirect node block 95. Further, inode pages including inode metadata by files exist.

Meanwhile, as shown in FIG. 5, in the computing system 1 according to an exemplary embodiment, the storage device 20 is divided into a first area I and a second area II. The file system 16 may divide the storage device 20 into the first area I and the second area II during formatting, although the various embodiments are not limited thereto. The first area I is a space in which various kinds of information managed by the whole system are stored, and may include, for example, information on the number of currently allocated files, the number of valid pages, and position information. The second area II is a space in which various kinds of directory information that a user actually uses, data, and file information, and the like, are stored.

Further, the first area I may be stored in a front portion of the storage device 20, and the second area II may be stored in a rear portion of the storage device 20. Here, the front portion means the portion that is in front of the rear portion based on physical addresses.

More specifically, the first region I may include superblocks 61 and 62, a check point area (CP) 63, a segment information table (SIT) 64, a node address table (NAT) 65, and a segment summary area (SSA) 66. Default information of the file system 16 is stored in the superblocks 61 and 62. For example, information such as the size of the blocks 51, the number of blocks 51, status flags (clean, stable, active, logging, and unknown) may be stored. As illustrated, two superblocks 61 and 62 may be provided, and the same contents may be stored in the respective superblocks 61 and 62. Accordingly, even if a problem occurs in one of the super blocks 61 and 62, the other may be used.

Check points are stored in a check point area 63. A check point is a logical breakpoint, and the states up to the breakpoint are completely preserved. If trouble occurs during operation of the computing system (for example, shutdown), the file system 16 may restore the data using the preserved check point. Such a check point may be generated periodically, at the time of mounting, or at the time of system shutdown, for example, although the various embodiments are not limited thereto.

As illustrated in FIG. 6, the node address table (NAT) 65 may include node identifiers (NODE ID) corresponding to the respective nodes and physical addresses corresponding to the node identifiers. For example, a node block corresponding to the node identifier N0 may correspond to a physical address a, a node block corresponding to the node identifier N1 may correspond to a physical address b, and a node block corresponding to the node identifier N2 may correspond to a physical address c. All nodes (inode, direct nodes, and indirect nodes) have inherent node identifiers, which may be allocated from the node address table 65. The node address table 65 may store the node identifier of the inode, the node identifiers of the direct nodes, and the node identifiers of the indirect nodes. The respective physical addresses corresponding to the respective node identifiers may be updated.

The segment information table (SIT) 64 includes the number of valid pages of each segment and bit maps of the pages. The bit map indicates whether each page is valid, indicated as "0" or "1". The segment information table 64 may be used in a cleaning task (or garbage collection). In particular, the bit map may reduce unnecessary read requests when the cleaning task is performed, and may be used to allocate the blocks during adaptive data logging.

The segment summary area (SSA) 66 is an area in which summary information of each segment of the second area II is gathered. In particular, the segment summary area 66 describes node information about nodes for blocks of each segment of the second area II. The segment summary area 66 may be used for cleaning tasks (or garbage collection). Specifically, in order to confirm the positions of the data blocks 70 or lower node blocks (e.g., direct node blocks), the node blocks 80, 81 to 88, and 91 to 95 have a node identifier list or addresses of node identifiers. By contrast, the segment summary area 66 provides indexes by which the data blocks 70 or the lower node blocks 80, 81 to 88, and 91 to 95 can confirm positions of higher node blocks 80, 81 to 88, and 91 to 95. The segment summary area 66 includes a plurality of segment summary blocks. One segment summary block has information on one segment located in the second area II. Further, the segment summary block is composed of multiple portions of summary information, and one portion of summary information corresponds to one data block or one node block.

The second area II may include data segments DS0 and DS1 and node segments NS0 and NS1, which are separated from each other. The plurality of data may be stored in the data segments DS0 and DS1, and the plurality of nodes may be stored in the node segments NS0 and NS1. If the data and the nodes are separated in different areas, the segments can be effectively managed, and the data can be read more effectively in a short time.

Further, write operations in the second area II are performed using a sequential access method, while write operations in the first area I are performed using a random access method. As mentioned above, the second area II may be stored in the rear portion of the storage device 20, and the first area I may be stored in the front portion of the storage device 20 in view of physical addresses.

The storage device 20 may be a solid state drive (SSD), in which case a buffer may be provided in the SSD. The buffer may be a single layer cell (SLC) memory, for example, having fast read/write operation speed. Therefore, the buffer may increase the write speed in the random access method in a limited space.

In FIG. 5, the first area I includes the superblocks 61 and 62, the check point area 63, the segment information table 64, the node address table 65, and the segment summary area 66, which are arranged in that order, although the various embodiments are not limited thereto. For example, the positions of the segment information table 64 and the node address table 65 may be reversed, and the positions of the node address table 65 and the segment summary area 66 may be reversed.

Figure 7:
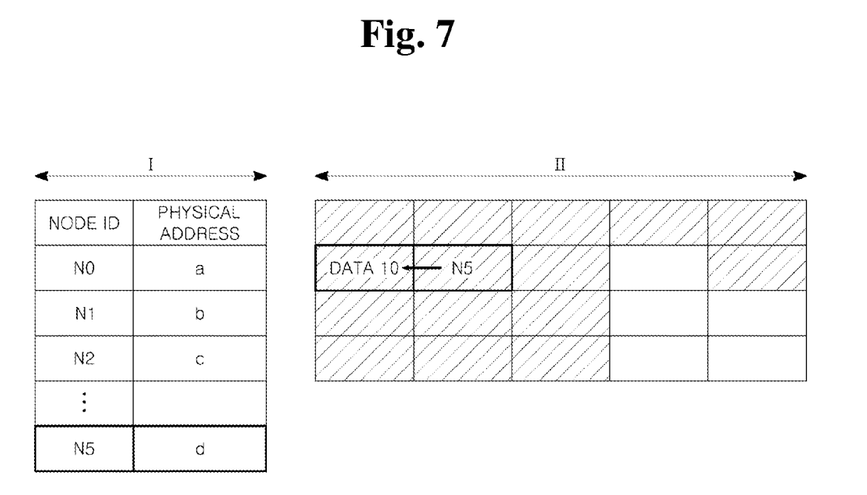
FIGS. 7 and 8 are conceptual diagrams explaining the data management method of a computing system, according to an embodiment of the inventive concept.
Figure 8:
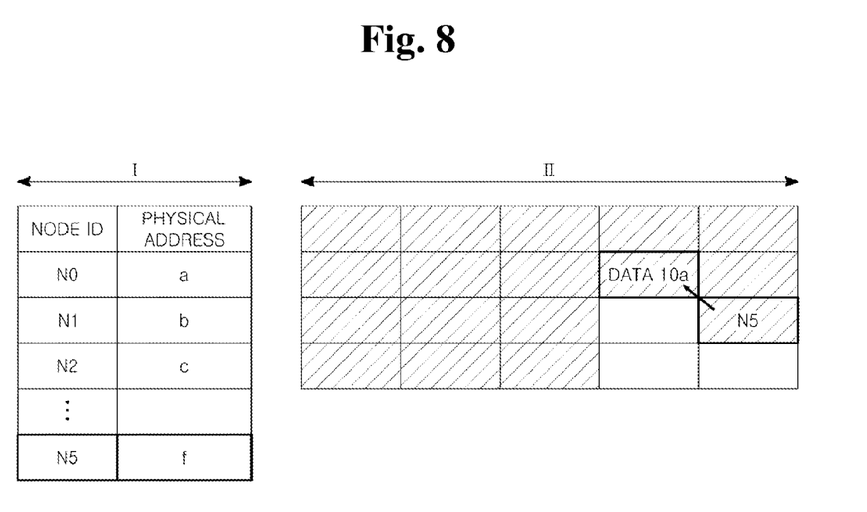

FIGS. 7 and 8 are conceptual diagrams explaining the data management method of a computing system, according to an exemplary embodiment. Hereinafter, with reference to FIGS. 7 and 8, a data management method of a computing system will be described.

Referring to FIG. 7, the file system 16 divides the storage device into the first area I and the second area II. As described above, the division of the storage device into the first area I and the second area II may be performed at the time of formatting.

As described above with reference to FIG. 4, the file system 16 may constitute one file with a plurality of data and a plurality of nodes (for example, an inode, direct nodes, and indirect nodes) related to the plurality of data, and may store the file in the storage device 20. At this time, all the nodes are allocated with node identifiers (NODE ID) from the node address table 65. For example, it is assumed that node identifiers N0 to N5 are allocated to first though fifth nodes, respectively. The node blocks corresponding to N0 to N5 correspond to respective physical addresses a, b, c . . . , and d. The hatched portions illustrated in FIG. 7 are portions in which the plurality of data and the plurality of nodes are written in the second area II.

For example, fifth node indicated by NODE ID N5 may be a direct node that indicates DATA10, and may be referred to as direct node N5. The direct node N5 is stored in the node block corresponding to the physical address d. In the node address table 65, the physical address d corresponds to the NODE ID N5, indicating that the direct node N5 is stored in the node block corresponding to the physical address d.

FIG. 8 depicts a case in which partial data DATA10 (first data) is corrected to DATA10*a* (second data) in the file. As mentioned above, information is written in the second area II using the sequential access method. Accordingly, the corrected data DATA10*a* is stored in a vacant data block at a new location. Further, the direct node N5 is corrected to indicate the data block in which the corrected data DATA10*a* is stored, and is stored in a vacant node block at a new location corresponding to the physical address f. Information is written in the first area I using the random access method. Accordingly, the node address table 65 is updated such that the physical address f corresponds to the NODE ID N5, overwriting the previous physical address d, indicating that the direct node N5 is stored in the node block corresponding to the physical address f.

Generally, the partial data in the file may be corrected as follows. Among the plurality of data, first data is stored in a first block corresponding to a first physical address. A first direct node indicates (points to) the first data, and the first direct node is stored in a second block corresponding to a second physical address. In the node address table, a first NODE ID of the first direct node corresponds to the second physical address to be stored. Second data is generated by correcting the first data. The second data is written in a third block corresponding to a third physical address that is different from the first physical address. The first direct node is corrected to indicate (point to) the second data, and is written in a fourth block corresponding to a fourth physical address that is different from the second physical address. Further, in the node address table, the second physical address corresponding to the first NODE ID of the first direct node is overwritten, so that the first NODE ID corresponds to the fourth physical address.

In the log structured file system, by using the node address table 65, the amount of data to be corrected and the node can be minimized when correcting the partial data of the file. That is, only the corrected data and the direct nodes that directly indicate the corrected data are written using the sequential access method, and it is not necessary to correct the inode or the indirect nodes that indicate the direct nodes. This is because the physical addresses corresponding to the direct nodes have been corrected in the node address table 65.

Figure 9:
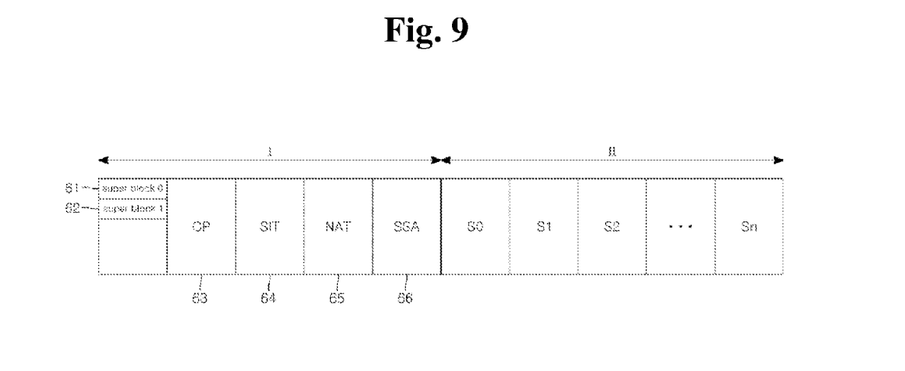
FIG. 9 is a block diagram for explaining the structure of a file that is stored in a storage device of a computing system, according to another embodiment of the inventive concept.

FIG. 9 is a block diagram for explaining the structure of a file that is stored in a storage device of a computing system, according to another embodiment of the inventive concept. For convenience, the explanation will focus on differences from the contents as described above with reference to FIGS. 1 to 8.

Referring to FIG. 9, in the storage device of the computing system according to another embodiment of the inventive concept, the second area II may include segments 51 to Sn (where, n is a natural number) which are separated from each other. In the respective segments S1 to Sn, data and nodes may be stored without distinction. In comparison, in the computing system according to an embodiment shown in FIG. 5, the storage device includes data segments DS0 and DS1 and node segments NS0 and NS1, which are separated from each other. The plurality of data may be stored in the data segments DS0 and DS1, and the plurality of nodes may be stored in the node segments NS0 and NS1.

Figure 10:
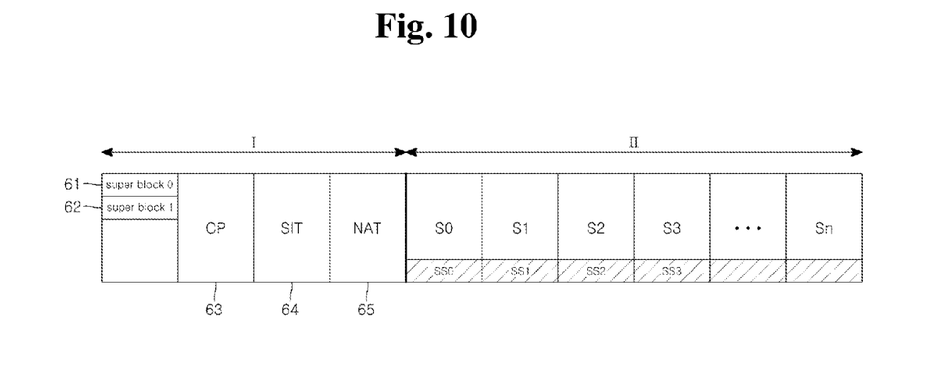
FIG. 10 is a block diagram for explaining the structure of a file that is stored in a storage device of a computing system, according to still another embodiment of the inventive concept.

FIG. 10 is a block diagram explaining the structure of a file that is stored in a storage device of a computing system according to still another embodiment of the inventive concept. For convenience, the explanation will focus on differences from the contents as described above with reference to FIGS. 1 to 8.

Referring to FIG. 10, in the storage device of the computing system according to still another embodiment of the inventive concept, the first area I does not include the segment summary area (SSA 66 in FIG. 5). That is, the first area I includes the superblocks 61 and 62, the check point area 62, the segment information table 64, and the node address table 65.

The segment summary information may be stored in the second area II. In particular, the second area II includes multiple segments S0 to Sn, and each of the segments S0 to Sn is divided into multiple blocks. The segment summary information may be stored in at least one block SS0 to SSn of each of the segments S0 to Sn.

Figure 11:
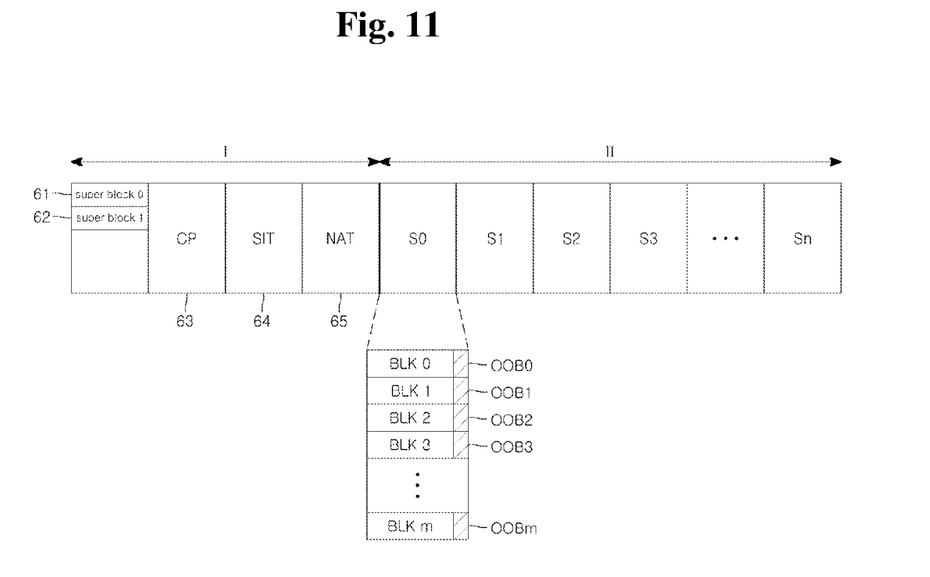
FIG. 11 is a block diagram for explaining the structure of a file that is stored in a storage device of a computing system, according to still another embodiment of the inventive concept.

FIG. 11 is a block diagram explaining the structure of a file that is stored in a storage device of a computing system according to still another embodiment of the inventive concept. For convenience, the explanation will focus on differences from the contents as described above with reference to FIGS. 1 to 8.

Referring to FIG. 11, in the storage device of the computing system according to still another embodiment of the inventive concept, the first area I does not include the segment summary area (SSA 66 in FIG. 5). That is, the first area I includes the superblocks 61 and 62, the check point area 62, the segment information table 64, and the node address table 65.

The segment summary information may be stored in the second area II. The second area II includes multiple segments 53, each of the segments 53 is divided into multiple blocks BLK0 to BLKm, and the blocks BLK0 to BLKm may include OOB (Out Of Band) areas OOB1 to OOBm (where, m is a natural number), respectively. The segment summary information may be stored in the OOB areas OOB1 to OOBm.

Hereinafter, a system, to which the computing system according to embodiments of the inventive concept is applied, will be described. The system described hereinafter is merely exemplary, and embodiments of the inventive concept are not limited thereto.

Figure 12:
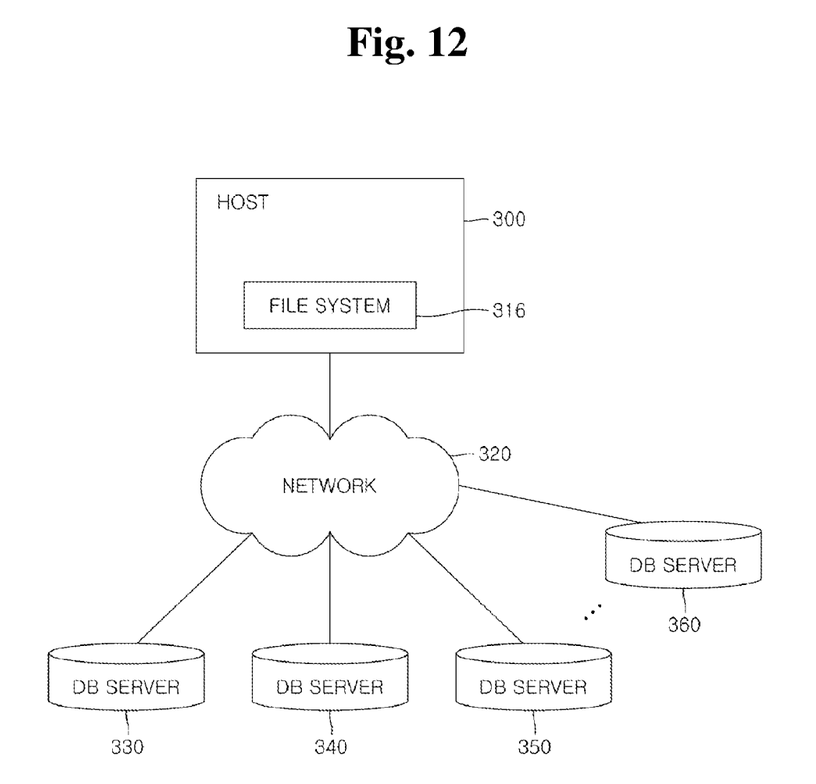
FIG. 12 is a block diagram explaining an example of a computing system, according to embodiments of the inventive concept.

FIG. 12 is a block diagram explaining an example of a computing system, according to embodiments of the inventive concept.

Referring to FIG. 12, a host server 300 is connected to database servers 330, 340, 350, and 360 through a network 20. In the host server 300, a file system 316 for managing data of the database servers 330, 340, 350, and 360 is installed. The file system 316 may be the F2FS file system, for example, as described above with reference to FIGS. 1 to 11.

Figure 13:
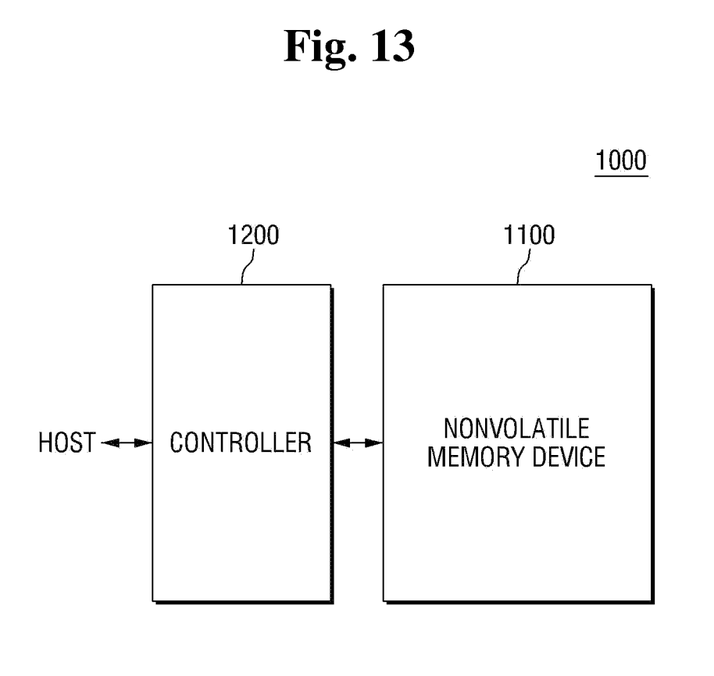
FIGS. 13 to 15 are block diagrams illustrating another example of a computing system, according to some embodiments of the inventive concept.
Figure 14:
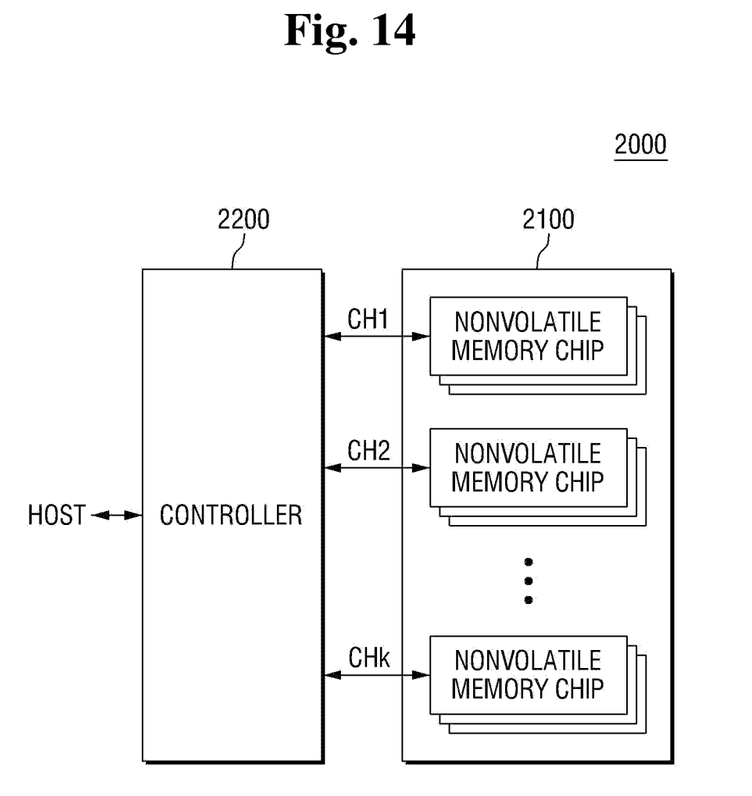
Figure 15:
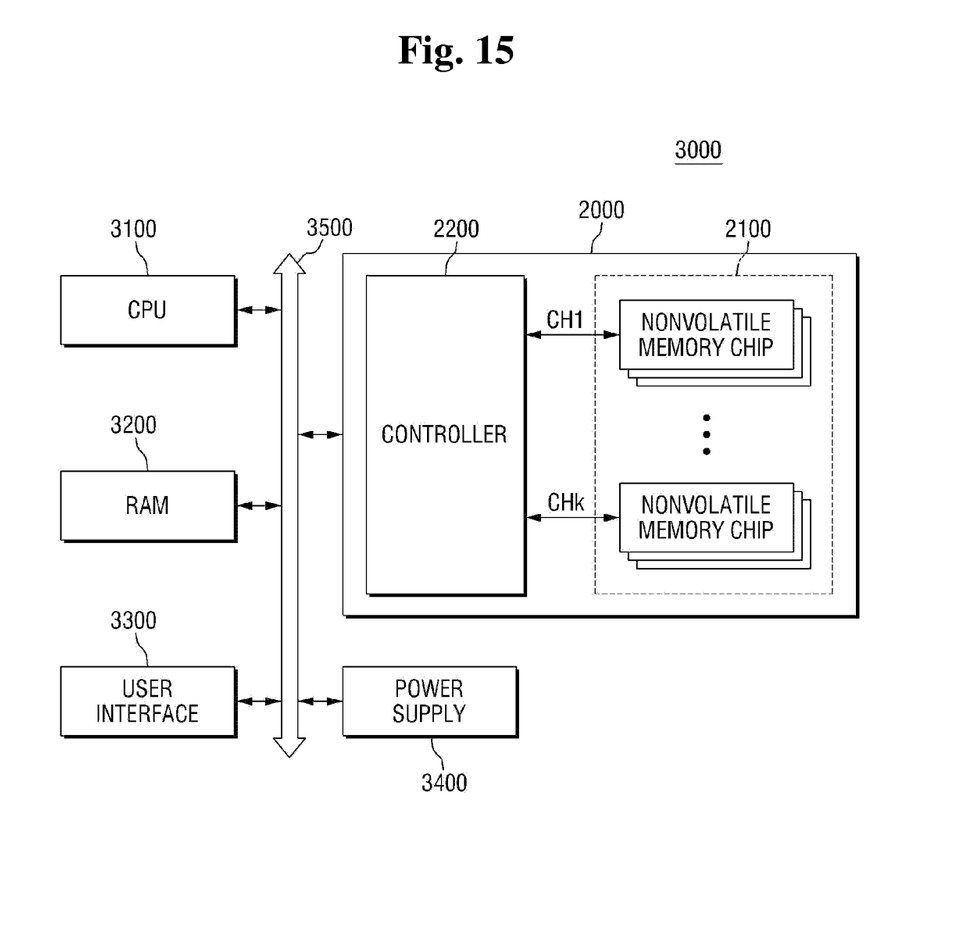

FIGS. 13 to 15 are block diagrams illustrating other examples of a computing system according to embodiments of the inventive concept.

First, referring to FIG. 13, a storage device 1000 (corresponding to storage device 20 in FIG. 1) includes a nonvolatile memory device 1100 and a controller 1200. The nonvolatile memory device 1100 may be configured to store the above-described superblocks 61 and 62, the check point area 63, the segment information table 64, and the node address table 65.

The controller 1200 is connected to a host and the nonvolatile memory device 1100. The controller 1200 is configured to access the nonvolatile memory device 1100 in response to requests from the host. For example, the controller 1200 may be configured to control read, write, erase, and background operations of the nonvolatile memory device 1100. The controller 1200 is configured to provide an interface between the nonvolatile memory device 1100 and the host. Further, the controller 1200 is configured to drive firmware to control the nonvolatile memory device 1100.

As an example, the controller 1200 may include well known constituent elements, such as random access memory (RAM), a central processing unit, a host interface, and a memory interface. The RAM may be used as at least one of an operating memory of the central processing unit, a cache memory between the nonvolatile memory device 1100 and the host, and a buffer memory between the nonvolatile memory device 1100 and the host. The processing unit controls the overall operation of the controller 1200.

The controller 1200 and the nonvolatile memory device 1100 may be integrated into one semiconductor device. For example, the controller 1200 and the nonvolatile memory device 1100 may be integrated into one semiconductor device to configure a memory card. For example, the controller 1200 and the nonvolatile memory device 1100 may be integrated into one semiconductor device to configure a memory card, such as a PC card (e.g., a Personal Computer Memory Card International Association (PCMCIA)), a compact flash (CF) card, a smart media card (SM or SMC), a memory stick, a multimedia card (MMC, RS-MMC, MMC-micro), a SD card (SD, miniSD, microSD, or SDHC), a universal flash storage device (UFS), or the like.

The controller 1200 and the nonvolatile memory device 1100 may be integrated into one semiconductor device to configure a SSD (Solid State Drive). The SSD includes a storage device that is configured to store data in a semiconductor memory. When the system 1000 is used as a semiconductor SSD, the operating speed of the host that is connected to the 1000 can be significantly improved.

As another example, the system 1000 may be provided as one of various constituent elements of electronic devices, such as a computer, a Ultra Mobile PC (UMPC), a work station, a net-book, a Personal Digital Assistant (PDA), a portable computer, a web tablet, a wireless phone, a mobile phone, a smart phone, an e-book, a Portable Multimedia Player (PMP), a portable game machine, a navigation device, a black box, a digital camera, a 3-dimensional television receiver, a digital audio recorder, a digital audio player, a digital picture recorder, a digital picture player, a digital video recorder, a digital video player, a device capable of transmitting and receiving information in a wireless environment, one of various electronic devices constituting a home network, one of various electronic devices constituting a computer network, one of various electronic devices constituting a telematics network, an RFID device, or one of various electronics devices constituting a computing system.

In addition, the nonvolatile memory device 1100 or the system 1000 may be mounted as various types of packages. For example, the nonvolatile memory device 1100 and/or the system 1000 may be packaged and mounted as PoP (Package on Package), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), or the like.

Referring to FIG. 14, a system 2000 includes a nonvolatile memory device 2100 and a controller 2200. The nonvolatile memory device 2100 includes multiple nonvolatile memory chips. The memory chips are divided into multiple groups. The respective groups of the nonvolatile memory chips are configured to communicate with the controller 2200 through one common channel. For example, it is illustrated that the nonvolatile memory chips communicate with the controller 2200 through first to k-th channels CH1 to CHk.

In FIG. 14, multiple nonvolatile memory chips are connected to one channel of the first to kth channels CH1 to CHk. However, it will be understood that the system 2000 may be modified such that one nonvolatile memory chip is connected to one channel of the first to kth channels CH1 to CHk.

Referring to FIG. 15, a system 3000 includes a central processing unit (CPU) 3100, a random access memory (RAM) 3200, a user interface 3300, a power supply 3400, and the system 2000 of FIG. 14. The system 2000 is electrically connected to the CPU 3100, the RAM 3200, the user interface 3300, and the power supply 3400 through a system bus 3500. Data which is provided through the user interface 3300 or is processed by the CPU 3100 is stored in the system 2000.

FIG. 15 the nonvolatile memory device 2100 is connected to the system bus 3500 through the controller 2200. Alternatively, the nonvolatile memory device 2100 may be configured to be directly connected to the system bus 3500.

While the inventive concept has been described with reference to illustrative embodiments, it will be apparent to those of ordinary skill in the art that various changes and modifications may be made without departing from the spirit and scope of the inventive concept. Therefore, it should be understood that the above embodiments are not limiting, but illustrative.

What is claimed is:

1. A data management method of a computing system comprising:
dividing a storage device into a first area and a second area;
storing a plurality of data and a plurality of nodes related to the plurality of data in the second area, the plurality of data including first data stored in a first block corresponding to a first physical address, and the plurality of nodes including a first node, indicating the first data, stored in a second block corresponding to a second physical address; and
storing a node address table in the first area, wherein the node address table includes a plurality of node identifiers corresponding to the plurality of nodes, including a first node identifier corresponding to the first node, and a plurality of physical addresses corresponding to the plurality of node identifiers, including the second physical address corresponding to the first node identifier;
correcting the first data to provide second data, and storing the second data in a vacant third block corresponding to a third physical address;
correcting the first node to indicate the second data, and storing the first node in a vacant fourth block corresponding to a fourth physical address; and
overwriting the second physical address, associated with the first node identifier in the node address table, with the fourth physical address.

2. The data management method of claim 1, wherein write operations in the second area are performed using a sequential access method, and write operations in the first area are performed using a random access method.

3. The data management method of claim 1, wherein the first area is stored in a front portion of the storage device, and the second area is stored in a rear portion of the storage device.

4. The data management method of claim 3, wherein the storage device includes a Solid State Drive (SSD).

5. The data management method of claim 1, wherein the second area comprise data segments and node segments, which are separated from each other, and wherein the plurality of data are stored in the data segments and the plurality of nodes are stored in the node segments.

6. The data management method of claim 1, wherein the second area comprises a plurality of segments, a plurality of pages being stored in each of the segments, the method further comprising:
storing a segment information table in the first area, wherein the segment information table includes the number of valid pages of each of the segments and bit maps of the plurality of pages.

7. The data management method of claim 1, wherein the second area comprises a plurality of segments, each of the segments being divided into a plurality of blocks, the method further comprising:
storing a segment summary area in the first area, wherein the segment summary area includes information regarding nodes to which the plurality of blocks of each of the segments belong.

8. The data management method of claim 1, wherein the second area includes a plurality of segments, each of the segments being divided into a plurality of blocks, and
wherein segment summary information is stored in at least one block of each of the segments, the segment summary information including information regarding nodes to which the plurality of blocks of each of the segments belong.

9. The data management method of claim 1, wherein the second area includes a plurality of segments, each of the segments being divided into a plurality of blocks, and each of the blocks including an OOB (Out Of Band) area, and
wherein segment summary information is stored in the OOB area of each of the blocks, the segment summary information including information regarding nodes to which the respective blocks belong.

10. The data management method of claim 1, wherein the plurality of data correspond to one file, and the plurality of nodes include inode, direct nodes, and indirect nodes.

11. The data management method of claim 10, wherein the node address table is configured to store a node identifier of the inode, node identifiers of the direct nodes, and node identifiers of the indirect nodes.

* * * * *